Nov. 12, 1940.   J. F. KOVALSKY   2,221,586
REGULATOR
Filed May 5, 1939
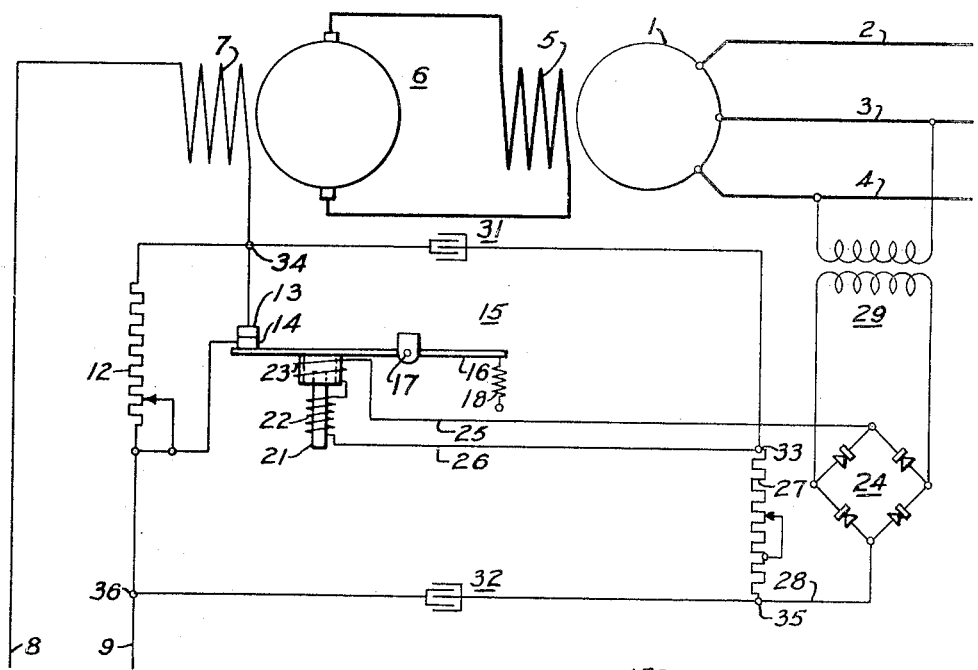
INVENTOR
Joseph F. Kovalsky.
BY
Franklin E. Hardy
ATTORNEY Patented Nov. 12, 1940

2,221,586

UNITED STATES PATENT OFFICE 2,221,586

REGULATOR

Joseph F. Kovalsky, Turtle Creek, Pa., assignor to Westinghouse Electric & Manufacturing Company, East Pittsburgh, Pa., a corporation of Pennsylvania Application May 5, 1939, Serial No. 271,908

8 Claims. (Cl. 171—229)

My invention relates to regulators of the type wherein a primary control relay is continuously vibrated for intermittently short circuiting a regulating resistor, such as are employed for governing the excitation of alternating current generators to maintain a regulated quantity, such as the generator voltage, at a desired value. In such regulators, a vibrating relay is caused to operate to intermittently short circuit a regulating resistor or a portion thereof to vary the resistance in circuit with the generator field winding for maintaining the regulated quantity at the desired value. The effective value of the resistor is determined by the ratio between the durations of time in which the resistor is short circuited and the durations of time during which the short circuit is removed.

It is desired to provide such regulators with means for anticipating the corrective action caused by a change in the field excitation of the generator prior to a completion of this action at the terminals of the generator in order to prevent overtravel in the corrective influence. Such stabilizing or anti-hunting forces have in the past been determined, in small regulators, by variations in the voltage drop across the field winding, or in the field current as the voltage applied to the field winding is varied for adjusting the excitation of the machine.

One conventional manner of introducing such stabilizing or anti-hunting forces into the primary relay circuit of dynamic type regulators is the feed-back transformer, the primary winding of which is connected to be energized in accordance with the field voltage or field current and the secondary winding of which is connected in the regulating relay control circuit to introduce voltage components into this circuit in a direction and of a value determined by the direction and rate of change of the excitation of the controlled machine. The use of feed-back transformers for this purpose introduces errors due to temperature changes in the copper conductors of the transformers which is undesirable in many applications. In order to avoid such temperature errors, it is necessary to design the transformer with relatively large diameter wire of a relatively few turns. In order to retain the same time constant of the transformer with a fewer number of turns, it is necessary to increase the amount of iron in the magnetic circuit so that the transformer becomes very large and heavy.

It is an object of this invention to provide a regulator for alternating current generators employing a simple condenser circuit for introducing an anti-hunting influence into the primary control element of the regulator without the necessity of using the heavier and more costly feed-back transformer, or equivalent device.

It is a further object of the invention to provide a circuit of the character described which isolates the field regulating circuit and the regulator control circuit of the equipment from each other to prevent the flow of direct current therebetween.

Other objects and advantages of my invention will be apparent from the following description of one preferred embodiment thereof, reference being had to the accompanying drawing, in which:

Figure 1 is a diagrammatic view of apparatus and circuits illustrating a preferred embodiment of the invention;

Fig. 2 is a view of curves illustrating varying current values;

Fig. 3 is a curve showing the relationship between varying values of certain quantities; and Fig. 4 is a view, partly in section and partly in side elevation, of a regulator relay that may be employed for controlling the output voltage of the regulated generator.

Referring to Figure 1 of the drawing, an alternating current generator 1 is illustrated for supplying energy to a three-phase circuit represented by conductors 2, 3 and 4 and having a field winding 5 that is energized from an exciter 6 having a field winding 7 that is supplied with direct current energy from a source represented by conductors 8 and 9. A regulating resistor 12 is provided in circuit with the field winding 7, the opposite ends of which are connected to contact members 13 and 14, respectively, of a regulating relay 15 of the vibrating type for varying the effective value of the resistor 12 in a well known manner. A moving lever 16 is provided and is mounted to be actuated about a pivot axis 17 for effecting movement of the movable contact member 14 into and out of engagement with the fixed contact member 13. The lever 16 is biased in one direction by a spring 18 and in the opposite direction by an electromagnet including a core structure 21 and series connected windings 22 and 23 that are connected in series to be energized in accordance with the output of a full-wave rectifier 24. The regulator control circuit extends from one output terminal of the rectifier 24 through conductor 25, windings 23 and 22, conductor 26, voltage adjusting rheostat 27 and conductor 28 to the other output terminal of the rectifier 24. The input to the rectifier 24 is connected through a transformer 29 from alternating current circuit conductors 3 and 4 that is a measure of the terminal voltage of the generator 1.

Means is provided for varying the current through the regulator relay windings 22 and 23 upon the engagement of the relay contact members 13 and 14 for introducing an anti-hunting influence into the operation of the relay, which consists of connecting the field regulating circuit and the regulator relay control circuit together through a condenser circuit which permits double frequency ripple current to flow from the rectifier 24 while preventing unidirectional current from flowing. The condenser circuit, as illustrated, consists of two condenser portions 31 and 32, the condenser portion 31 being connected from a junction point 33 between the voltage adjusting rheostat 27 and the regulator relay winding to a junction point 34 between the field winding 7 and the field regulating resistor 12. The condenser portion 32 is connected between a junction point 35, at the opposite end of the voltage adjusting resistor 27 from the junction point 33, to a junction point 36 at the opposite end of the regulating resistor 12 from the junction point 34.

Referring to Fig. 4, the regulator there illustrated may be employed as the primary relay 30 of the regulator system organized in accordance with my invention and corresponds substantially to the regulator constituting the subject matter of United States Patent No. 1,820,712 for "Voltage regulator," issued August 5, 1931, to Walter Schaelchlin and assigned to the same assignee as this application. The regulator comprises a magnetic structure 21 including a central or winding leg 38 and an outer leg 39 terminating an annual portion 42 surrounding one end of the winding leg 38. The winding 22 is provided for magnetizing the core and is mounted upon the major portion of the winding leg 38 and connected in series circuit relation with the smaller winding 23 that is mounted upon a movable bifurcated arm 16. The winding 23 is positioned with its conductors surrounding one end of the winding leg 38 of the magnet structure and within the flux path between the winding leg and the annular portion 23 that surrounds the left-end of the winding leg 38, as viewed in Fig. 4.

The annular portion 42 of the magnet structure is provided with upwardly extending bracket portions 43, one of which is shown in dotted lines in Fig. 4, and upon which the bifurcated arm 16 is supported by means of a square bar 44 extending through the vanes of the arms 16 between the two bracket portions 43, the edge 17 of which serves as the axis for the moving structure. A similar bar 45 extends between the vanes of the arm 16 to provide a fulcrum point about which a force is applied to bias the arm 16 against the magnetic pull of the armature winding 23. The bars 44 and 45 are held in their illustrated positions by means of clamping members 46 and 47 that are held together by a bolt 48.

The movable coil 23 is mounted upon a metal sleeve 51 that is attached to the vanes of the arm 16 by any suitable means, such as rivets 52. The vanes of the arm 16 are connected at their upper ends by means of a transverse member 53 to which a bracket 54 is attached for carrying the movable contact member 14. The stationary contact member 13 that cooperates with the movable contact member 14 is mounted on the panelboard 55 by a suitable means, such as a bracket 56 and screw 57. The biasing spring 18 that is provided is attached at one end to an adjusting screw 58 carried by bracket 59 that extends upwardly from the magnet structure. The other end of the spring 18 is attached to a flat hook member 62 which engages the bar 45 to actuate the arm 16 in a clockwise direction about the axis 17, as viewed in Fig. 4, thereby normally maintaining the contact members 13 and 14 in engagement.

The rectifier 24 may be the single-phase double-wave dry type, and will deliver to the output circuit a uni-directional current having a double-frequency ripple, as shown by the curve 63 above the zero-line in Fig. 2. If the voltage applied to the rectifier from the transformer 29 is a 60-cycle alternating current, the ripple shown in Fig. 2 will be a 120-cycle ripple. With a constant voltage applied to the rectifier 24 from the transformer 29, and with the contact members 13 and 14 separated, the current through the relay windings 22 and 23 will have the same constant effective value, as shown by the full line curve 63 in Fig. 2. When the contact members 13 and 14 are brought into engagement, the ripple current flowing through condenser portions 31 and 32 and the contact members 13 and 14 will cause the effective value of the ripple current through the windings 23 and 22 to increase to some greater value as shown by the dotted line 64 in Fig. 2.

The curve 37 in Fig. 3 shows the effect of varying the capacitance of the condensers 31 and 32 on the increase in current flowing through the relay coil when the contact members 13 and 14 are in engagement.

The operation of the regulator is as follows: When the generator 1 is started and the voltage is below its normal or desired value, the contact member 14 is biased by the spring 18 into engagement with the contact member 13, thus short circuiting the regulating resistor 12 and causing the full voltage of the source 8—9 to be applied to the field winding 7 of the exciter generator to increase the exciter generator voltage and the voltage of the main generator 1. As the voltage of the generator builds up to its desired value, which is determined by adjusting the tension of the spring 18 and the value of the resistor 27, the movable winding 23 will be attracted toward the winding 22 against the bias of the spring 18, thus causing the contact members 14 and 13 to separate and introduce the resistor 12 in the field winding circuit of the exciter generator. The introduction of the resistor 12 in the field circuit causes the voltage of the exciter generator 6 and of the main generator 1 to decrease, thus again decreasing the energization of the windings 22 and 23 and permitting the reengagement of the contact members 14 and 13. The regulator will thus continue to vibrate causing repeated engagement and separation of the contact members 14 and 14 to correspondingly vary the effective value of the resistor 12 in the field winding circuit and effect slight alternate increasing and decreasing energization of the field windings of the two machines within narrow limits to maintain the constantly desired voltage on the generator 1.

Engagement of contact members 13 and 14 causes the ripple current through the relay windings to increase from the value indicated by the line 63 in Fig. 2 to the value indicated by the line 64, causing the pull on the armature winding 23 to increase sooner than it otherwise would, to cause a separation of the contact members 13 and 14 earlier than would be the case if the separation occurred only upon a completion of the increase in voltage between conductors 3 and 4 to the desired value. The time lag between a particualr field current (in the exciter and in the generator) and the ultimate increase in voltage caused thereby causes a slight further increase in the voltage at the generator terminals, thus making it desirable to separate the contact members 13 and 14 slightly before a completion in the rise of a voltage to the desired value.

It will be noted that with the condensers 31 and 32 connected as shown in Fig. 1, the control circuit for the relay windings 22 and 23 is isolated so far as direct current is concerned, since direct current will not flow through a condenser. Thus, should, for any reason, a ground occur on any part of the field winding circuit, this will not disturb the operation of the regulator relay control circuit. In different applications of a vibrating regulator of the type disclosed to different sizes of machines, it is necessary to vary the ohms employed in the regulating resistor 12, which factor would modify the possible degree of anti-hunting to be obtained from a regulator of the type described, as applied to different generator applications, if the anti-hunting were obtained by directly short circuiting the voltage adjusting resistor 27 through the regulator contacts 13 and 14. On the other hand, the increased current for introducing a stabilizing or anti-hunting influence into the regulator is, with applicant's circuit arrangements, determined by the values of capacitance used in condenser portions 31 and 32, and remains the same for all machine applications independently of the differing conditions in the field regulating circuit.

It will be apparent to any one skilled in the art that modifications in the circuits and apparatus illustrated may be made within the spirit of my invention, and I do not wish to be limited otherwise than by the scope of the appended claims.

I claim as my invention:

1. In a regulating system, an alternating current generator, means for controlling the excitation of said generator comprising a field energizing circuit including a field winding and a regulating resistor for adjusting the voltage applied to the field winding, a regulating relay for intermittently short circuiting said regulating resistor having an operating winding, means for energizing said winding in accordance with a regulated characteristic of said generator comprising a rectifier supplied with alternating current at a voltage that is a measure of the regulated characteristic and a control circuit supplied with unidirectional current from the rectifier and including the relay winding, a condenser, and means operative upon the short circuiting of said regulating resistor for introducing said condenser in circuit with said relay winding for modifying the relay current to introduce an anti-hunting action into the operation of the relay.

2. In a regulating system, an alternating current generator, means for controlling the excitation of said generator comprising a field energizing circuit including a field winding and a regulating resistor for adjusting the voltage applied to the field winding, a regulating relay for intermittently short circuiting said regulating resistor having an operating winding, means for energizing said winding in accordance with a regulated characteristic of said generator comprising a rectifier supplied with alternating current at a voltage that is a measure of the regulated characteristic and a control circuit supplied with unidirectional current from the rectifier and including the relay winding and a voltage adjusting resistor, a condenser, and means, operative upon the short circuiting of the regulating resistor for varying the voltage drop across the condenser in series circuit with said relay winding for modifying the relay current to effect an anti-hunting action of the regulator.

3. In a regulating system, an alternating current generator, means for controlling the excitation of said generator comprising a field energizing circuit including a field winding and a regulating resistor for adjusting the voltage applied to the field winding, a regulating relay for intermittently short circuiting said regulating resistor having an operating winding, means for energizing said winding in accordance with a regulated characteristic of said generator comprising a rectifier supplied with alternating current at a voltage that is a measure of the regulated characteristic and a control circuit supplied with uni-directional current from the rectifier and including the relay winding and a voltage adjusting resistor, a condenser, and means, operative upon the short circuiting of the regulating resistor for causing a current flow through the condenser in parallel circuit relation to the current flowing through said voltage adjusting resistor to increase the flow of current through the relay winding.

4. In a regulating system, an alternating current generator, means for controlling the excitation of said generator comprising a field energizing circuit including a field winding and a regulating resistor for adjusting the voltage applied to the field winding, a regulating relay for intermittently short circuiting said regulating resistor having an operating winding, means for energizing said winding in accordance with a regulated characteristic of said generator comprising a rectifier supplied with alternating current at a voltage that is a measure of the regulated characteristic and a control circuit supplied with unidirectional current from the rectifier and including the relay winding and a voltage adjusting resistor, and condenser portions connected between the respective ends of said regulating resistor and the corresponding ends of said voltage adjusting resistor to isolate the circuits of the two resistors against the flow of unidirectional current therebetween.

5. In a regulating system, an alternating current generator, means for controlling the excitation of the generator comprising a field winding circuit including a regulating resistor for adjusting the voltage applied to the field winding, a continuously vibrating regulating relay for intermittently short circuiting the regulating resistor to control is effective value, said relay having an operating winding, a control circuit including said operating winding and a voltage adjusting resistor, a source of unidirectional current for said control circuit comprising a rectifier energized from an alternating current circuit at a voltage that is a measure of the regulated quantity, condenser means connected between the field winding circuit and the control circuit to prevent the flow of unidirectional current between these two circuits, said relay being effective, upon short circuiting said regulating resistor, to also cause a current flow through said condenser means in shunt relation to said voltage adjusting resistor and in series with said relay winding to increase the flow of current through the relay operating winding.

6. In a regulating system, an alternating current generator, means for controlling the excitation of the generator comprising a field winding circuit including a regulating resistor for adjusting the voltage applied to the field winding, a continuously vibrating regulating relay for intermittently short circuiting the regulating resistor to control its effective value, said relay having an operating winding, a control circuit including said operating winding and a voltage adjusting resistor, means for supplying unidirectional current to said control circuit comprising a rectifier energized from an alternating current circuit at a voltage that is a measure of the regulated quantity, condenser means connected between the field winding circuit and the control circuit to prevent the flow of unidirectional current between these two circuits, and means operative for short circuiting the regulating resistor and for applying a voltage across the condenser in series circuit with the relay winding to cause the flow of ripple current from the rectifier therethrough for causing a stabilizing component of current to flow through the relay winding.

7. In a regulating system, an alternating current generator, means for controlling the excitation of said generator comprising a field energizing circuit including a field winding and a regulating resistor for adjusting the voltage applied to the field winding, a regulating relay for intermittently short circuiting said regulating resistor having an operating winding, means for energizing said winding in accordance with a regulated characteristic of said generator comprising a rectifier supplied with alternating current at a voltage that is a measure of the regulated characteristic and a control circuit supplied with unidirectional current from the rectifier and including the relay winding, and condenser portions connected between the respective ends of said regulating resistor and said voltage adjusting resistor to isolate the circuits of the two resistors against the flow of unidirectional current therebetween, and common means for short circuiting the regulating resistor and for applying a voltage across the condenser in series circuit with the relay winding to cause the flow of ripple current from the rectifier therethrough for causing a stabilizing component of current to flow through the relay winding.

8. In a regulating system, an alternating current generator, means for controlling the excitation of the generator comprising a field winding circuit including a regulating resistor for adjusting the voltage applied to the field winding, a continuously vibrating regulating relay for intermittently short circuiting the regulating resistor to control its effective value, said relay having an operating winding, a control circuit including said operating winding and a voltage adjusting resistor, means for supplying unidirectional current to said control circuit comprising a rectifier energized from an alternating current circuit at a voltage that is a measure of the regulated quantity, condenser portions connected between the respective ends of said regulating resistor and said voltage adjusting resistor to isolate the circuits of these two resistors against the flow of unidirectional current therebetween and to permit the flow of ripple current from the rectifier therethrough upon the short circuiting of the regulating resistor to effect an antihunting action of the regulator.

JOSEPH F. KOVALSKY.